United States Patent [19]
Wiesler et al.

[11] 3,847,284
[45] Nov. 12, 1974

[54] MAGNETIC TAPE DIE SORTING SYSTEM

[75] Inventors: Mordechai Wiesler, Lexington; Samuel Havdala, Woburn, both of Mass.

[73] Assignee: Teledyne, Inc., Hawthorne, Calif.

[22] Filed: May 11, 1973

[21] Appl. No.: 359,305

[52] U.S. Cl............................................ 209/81 R
[51] Int. Cl............................................. B07c 5/344
[58] Field of Search............... 209/72, 73, 74 R, 81; 324/73 R

[56] References Cited
UNITED STATES PATENTS
| | | | |
|---|---|---|---|
| 3,410,401 | 11/1968 | Drop | 209/81 R X |
| 3,584,741 | 6/1971 | Schirmer | 209/81 R X |
| 3,720,309 | 3/1973 | Weir | 209/81 R X |

Primary Examiner—Richard A. Schacher
Attorney, Agent, or Firm—Morse, Altman, Oates & Bello

[57] ABSTRACT

An array of semiconductor devices in a monolithic wafer having a reference mark thereon is incrementally probed and tested for generating coded test data signals representing the characteristics of each device and coded position data signals defining the XY coordinates of the tested device with respect to the reference mark. The coded test data signals and the coded position data signals are recorded on a magnetic tape. Thereafter, the tested wafer is mounted on a pressure-sensitive adhesive web, scored and the individual devices are separated while maintaining their original orientation. The magnetic tape and wafer are then placed in a die transfer system and selected die types define by the test data and located by the position data are removed from the wafer by means of a cooperating and reciprocating vacuum collet and needle mechanism and are deposited at selected stations.

17 Claims, 5 Drawing Figures

MAGNETIC TAPE DIE SORTING SYSTEM

BACKGROUND OF THE INVENTION

1. Field of Invention

The present invention relates generally to the classification and sorting of individual semiconductor devices from a monolithic wafer and, more particularly, is directed towards a method and apparatus involving the magnetic recording of test data and coordinate position data for selective sorting of semiconductor devices in a monolithic wafer.

2. Description of the Prior Art

In the production of semiconductor devices from a monolithic wafer it has been necessary, by reason of the imperfect state of the art, to individually test and separate the dies of a monolithic wafer into categories of varying qualities and characterisitics. While all dies on a given wafer are theoretically designed and intended to be identical, in practice a rather wide variation appears in the quality of the dies. Heretofore, the sorting of dies according to their characteristics was carried out in various ways. One such technique involved testing and marking each device with ink in a color code and then physically sorting the dies according to the color coding. Other techniques also have been employed but none have been entirely satisfactory from the standpoint of speed of operation, cost and overall efficiency.

SUMMARY OF THE INVENTION

It is an object of the present invention to provide a new and improved method and associated apparatus for quickly, accurately and efficiently sorting individual semiconductive devices from a monolithic wafer.

The invention provides a method of sorting semicondutive devices from a monolithic wafer comprising the steps of producing a reference mark on the wafer; probing and testing each die; recording test data and position data for each die on a magnetic recording tape, the test data representing the characteristics of each die and the position data defining the XY coordinate location of each tested die with respect to the reference mark; mounting the wafer on a pressure-sensitive web; scribing and breaking the wafer so as to separate individual dies while maintaining their original orientation; mounting the wafer with its associated magnetic tape in a die transfer mechanism, removing selected die types from the wafer by means of cooperative reciprocating vacuum collet and reciprocating needle mechanism according to the test data obtained at each coordinate position; and depositing the removed dice at selected stations.

The invention also provides a die sorting system comprised of a probing system and transfer system for sorting semiconductor devices from a monolithic wafer. The probing system includes a prober assembly, a magnetic tape unit and an electronic processor for magnetically recording coded data representing test data of the characteristics of each die and the XY coordinate position of each tested die with respect to a reference device on the wafer. The transfer system includes a tape reader, an electronic processor and a transfer mechanism for removing selected dies from the wafer in accordance with category signals generated by a pin-board assembly. The coded data defining selected die characteristics is read from the magnetic tape and appropriate driving signals are generated for indexing an XY table, on which the wafer is mounted, to the coordinate position of the selected die. A cooperating and reciprocating vacuum collet and needle mechanism separate the selected die from the wafer and an indexer deposits it at selected stations according to the category signals generated by the pin-board assembly.

The invention accordingly comprises the method steps and apparatus possessing the construction, combination of elements, and arrangement of parts that are exemplified in the following detailed disclosure, the scope of which will be indicated in the accompanying claims.

BRIEF DESCRIPTION OF THE DRAWINGS

For a fuller understanding of the nature and objects of the present invention, reference should be had to the following detailed description taken in connection with the accompanying drawings wherein.

DETAILED DESCRIPTION OF THE INVENTION

Figure 3:
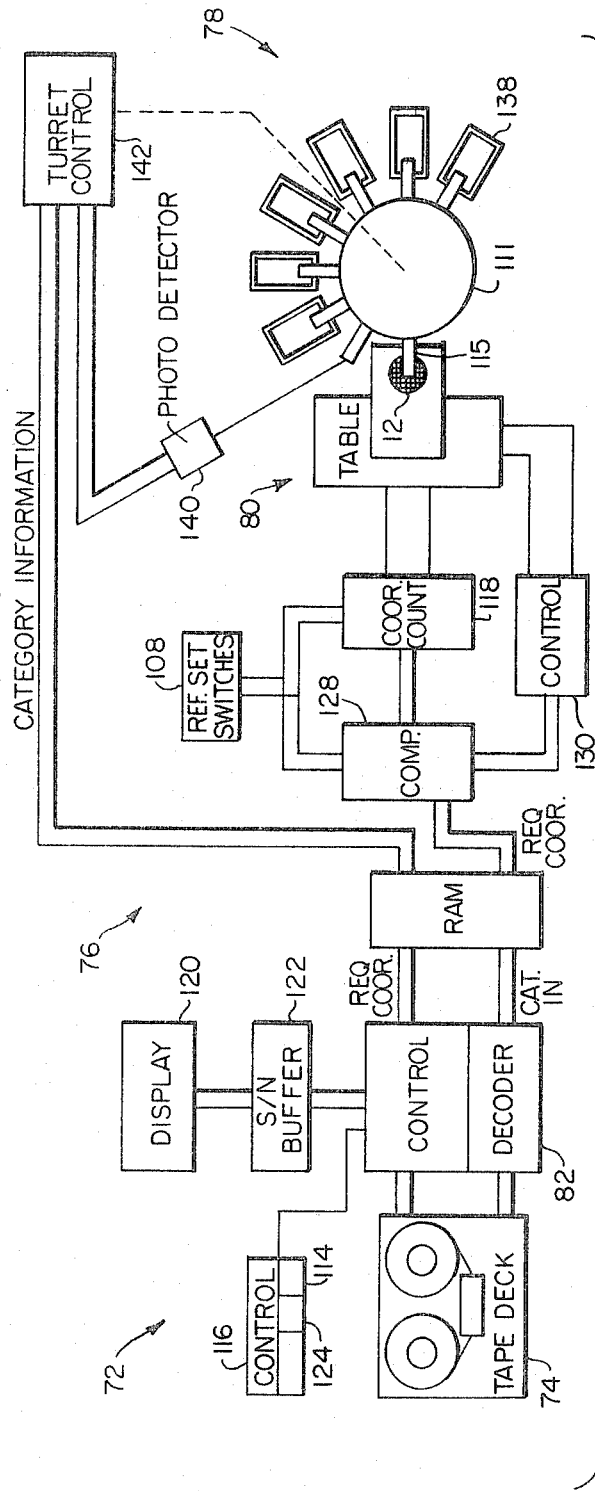
FIG. 3 is a block and schematic diagram of a die transfer system for removing the semiconductor devices having selected characteristics.

Generally, the present invention may be characterized as a method and apparatus for probing a monolithic wafer of semiconductor devices arranged in a grid pattern for producing a magnetic recording of coded data defining individual die characteristics at absolute XY coordinate positions and for removing the dies according to the recorded coded data. The method comprises the steps of marking a reference location on the wafer; magnetically recording the XY coordinates of the reference location on a recording stratum; incrementally indexing an XY table on which the wafer is mounted and testing each die; magnetically recording coded test data signals and coded position data signals on the recording stratum, the coded test data signals represent the characteristics of each die and the coded positioning data signals define the XY coordinate position of each die with respect to the XY coordinate position of the reference mark; mounting the wafer on an adhesive stratum; scribing and breaking the wafer so as to separate the dies while maintaining their original orientation; generating drive signals for moving an XY table to selected XY coordinate positions at which there are dies of predetermined characteristics defined by the recorded coded data signals; removing the selected dies from the monolithic wafer by means of cooperative reciprocating vacuum collet and reciprocating needle mechanism; and depositing the removed dies into delivery stations according to the coded test data signals. The probing system for producing a magnetic recording of the coded data is illustrated in FIG. 1 and the transfer system for removing selected dies is shown in FIG. 3.

Figure 1:
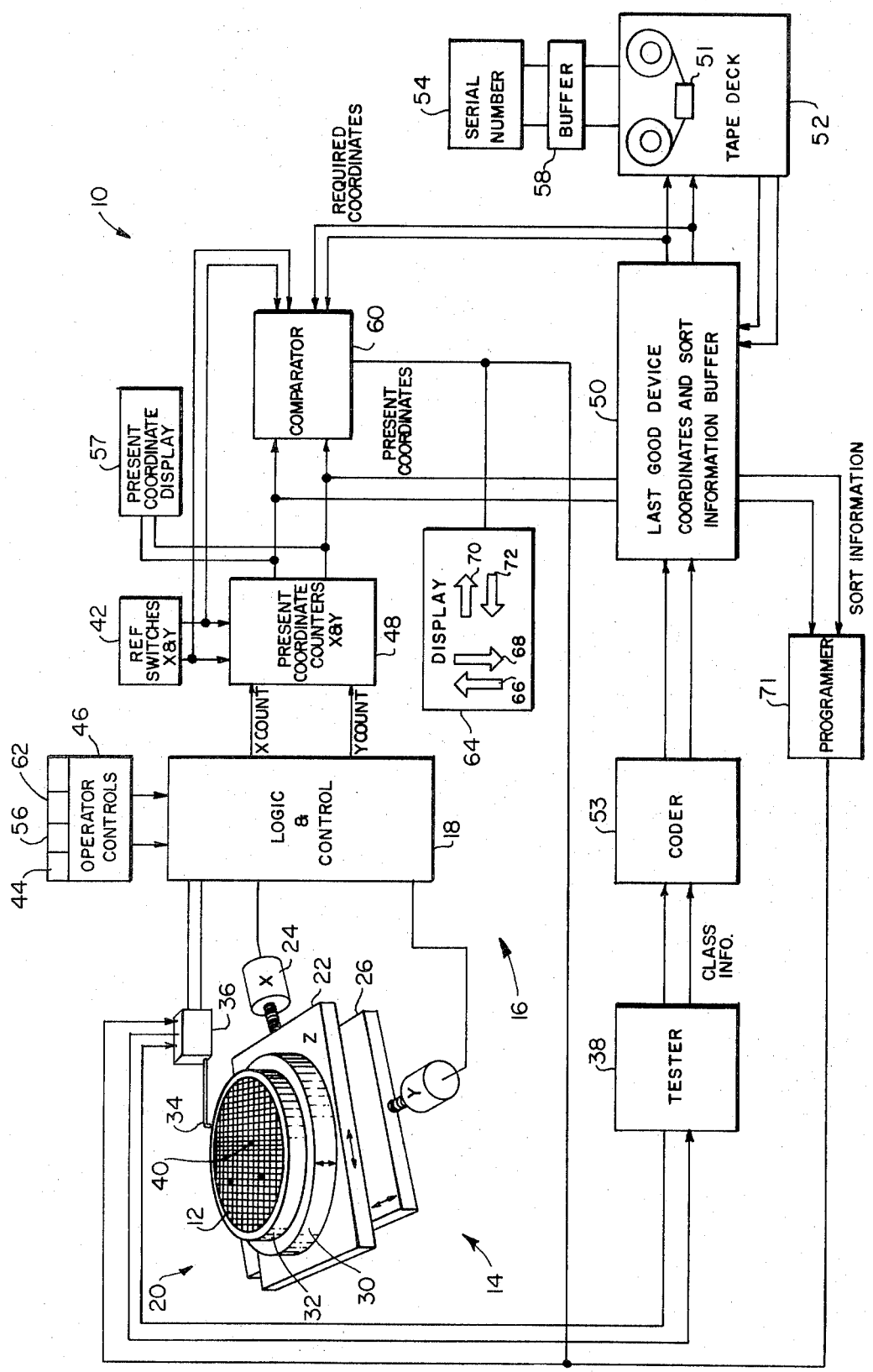
FIG. 1 is a block and schematic diagram of a probing system testing semiconductor on a monolithic wafer and for magnetically recording die characteristics and coordinate position data.

Referring now to the drawings, particularly FIG. 1, there is shown a probing system 10 for determining the characteristics of semiconductor devices arranged in a grid pattern on a monolithic wafer 12. Probing system 10 is comprised of a prober 14 and processing electronics 16 which are interconnected by means of a logic and control unit 18. Prober 14 includes an XY table 20 having a X table 22 driven by an X motor 24 along an X axis and a Y table 26 driven by a Y motor 28 along a Y axis, the X and Y axes being mutually perpendicular to one another. A Z stage 30, adapted to be reciprocated along a vertical Z axis, is mounted to XY table 20. A holding device 32, for example a vacuum chuck, is mounted to Z stage 30 and carries monolithic wafer 12. Test probes 34, in position opposite wafer 12, are mounted to a test head assembly 36 which is operatively connected to a tester 38.

Prober 14 receives coded input signals generated by a programmer (not shown), for example a computer or a tape reader, as disclosed in U.S. Pat. No. 3,585,480, assigned to the assignee of the present application and incorporated herein by reference. The coded input signals are employed to drive X motor 24 and Y motor 28 for predetermined periods so as to index XY table 20 and selectively position wafer 12 with respect to probe 34. Each time wafer 12 is moved to a predetermined coordinate position, Z stage 30 is reciprocated upwards, wafer 12 engages the the tips of probes 34 and the contacted die is tested.

Probing of wafer 12 is initiated by positioning XY table 20 so that probes 34 are in registration with one of reference marks 40 provided on wafer 12 by masking or marking with an inker. An arbitrary XY reference address is assigned to reference mark 40 by means of reference switch assembly 42, for example digi-switches. A reference switch 44 in an operator control unit 46 is energized and the XY reference address is entered into a memory 48, for example present coordinate counters. The XY reference address is applied to a buffer 50, denoted last good device coordinates and sort information buffer, and recorded on a magnetic recording stratum 51 in a recording device 52, for example a tape deck assembly such as a cassette tape recorder. Thereafter, a serial number is assigned to wafer 12 by means of a serial number switch assembly 54, for example digi-switches. A serial number switch 56 on operator control unit 46 is energized and coded signals representing the selected serial number are applied to tape deck assembly 52 via a buffer 58, for example a parallel to serial shift register, and recorded on magnetic recording stratum 51. Although certain interconnections have been omitted in the drawings for clarity, it is to be understood that logic and control 18, reference switch assembly 42, operator control unit 46 and serial number switch assembly 54 logically communicate with one another to provide the operation hereinbefore and hereinafter described. After the XY reference address and the serial number have been recorded on magnetic recording stratum 51, for example a magnetic tape, wafer 12 is indexed to predetermined coordinates until each semiconductor device is tested. The address location and characteristic classification of each semiconductor device on wafer 12 is recorded on magnetic tape 51. Classification data signals generated by tester 38 are converted to coded classification data signals in a coder 53 and applied to buffer 50. In the illustrated embodiment, by way of example, the data is recorded on magnetic tape 51 in three 9-bit bytes. The first byte includes one bit for indicating whether classification data or serial number data is being recorded, five bits defining classification, one bit for X location, one bit for Y location and one party bit. The second byte includes eight bits for X location and one parity bit, the X location bit in the first byte and X location bits in the second byte define the X coordinate. The third byte includes eight bits for Y location and one parity bit, the one Y location bit in the first byte and Y location bits in the third byte define the Y coordinate. It is to be noted that the X and Y coordinates, of each semiconductor device tested is given with respect to the X and Y coordinates of reference mark 40.

In the preferred embodiment, if the characteristics of a device under test is below a predetermined specification, tester 38 generates a coded signal indicating that the tested device is unacceptable. In this case, the address location and the characteristic classification of the tested device is not recorded on magnetic tape 51. If the characteristics of the device under test is within the predetermined specification, the address location and characteristic classification of this good device is recorded on magnetic tape 51. The address of the last good device tested is stored in buffer 50 until the next good device is located. In the event of a malfunction, for example misindexing or probe breakage, indexing of wafer 12 can be returned to the coordinate position of the last good device once the malfunction has been rectified. After the malfunction has been corrected, XY table 20 is indexed until reference mark 40 is in registration with the tip of probe 34 and the testing sequence continues when a return switch 62 is energized. The location of probes 34 with respect to wafer 12 is presented on a present coordinate display 57.

Figure 2:
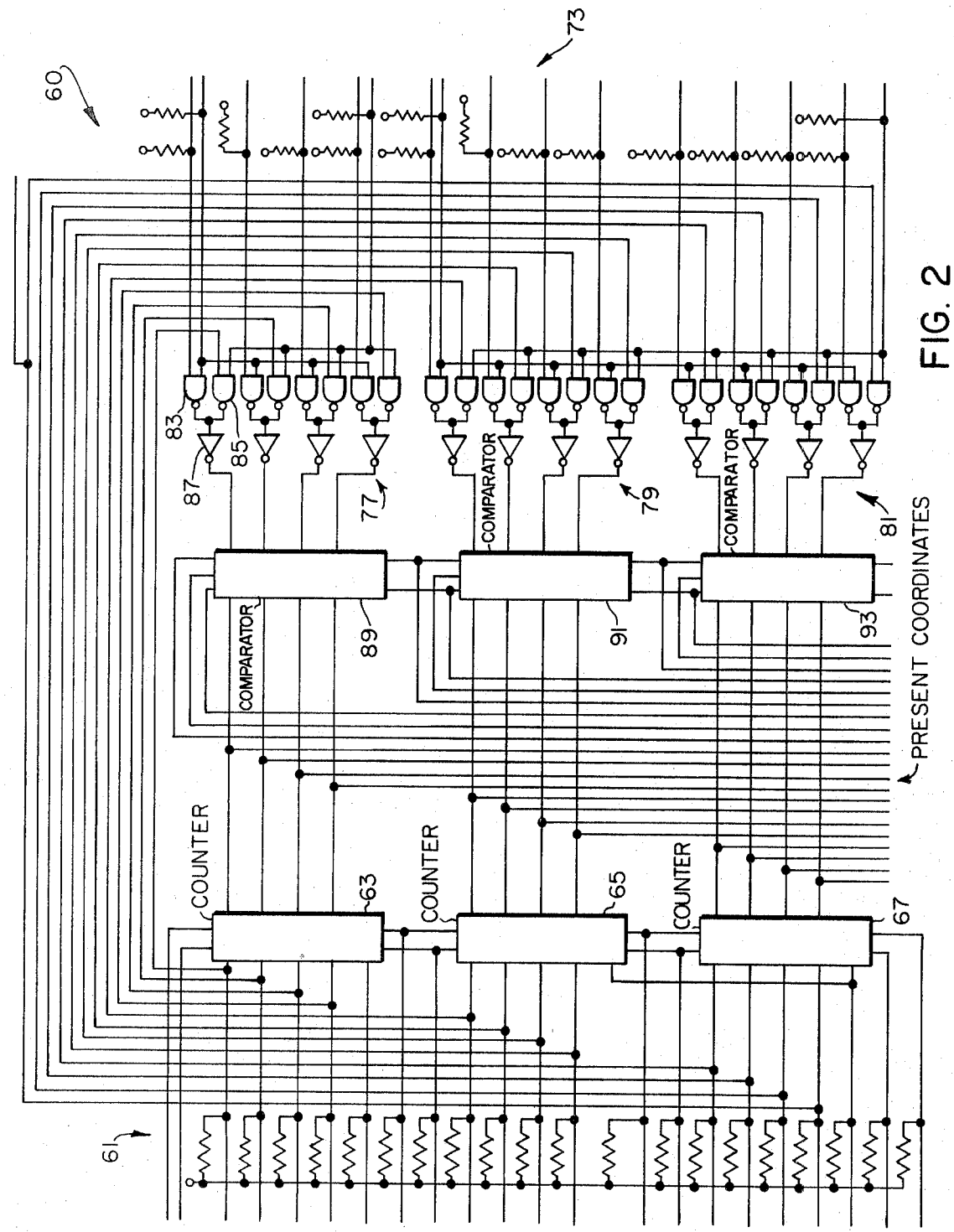
FIG. 2 is a detailed block and schematic diagram of one axis present coordinates and the comparator circuitry of FIG. 1.

As best shown in FIG. 2, reference coordinate data signals and required coordinate data signals are applied to a comparator 60. When digi-switches 42 are energized, signals generated thereby are applied to a series of binary weighted input circuits 61 arranged in three sets defining the hundreds, tens and unit digits of the reference address coordinates. The binary signals defining the hundreds digit are applied to a four bit counter 63, the binary signals defining the tens digit are applied to a four bit counter 65 and the binary signals defining the units digit are applied to a four bit counter 67; present coordinate counter 48 being comprised of counters 63, 65 and 67. The required coordinate data signals generated by buffer 50 are applied to a series of binary weighted input circuits 73 arranged in three sets defining the hundreds, tens and units digits of the required coordinates. The binary signals defining the hundreds digits of the reference address and the required coordinate address are applied to a multiplexer 77 the binary signals defining the tens digits of the reference address and the required coordinate address are applied to a multiplexer 79 and the binary signals defining the units digit of the reference address and the required coordinate address are applied to a multiplexer 81. It is to be noted that multiplexers 77, 79, and 81 are similar and include four like stages, each stage having a pair of NAND gates 83, 85 and an inverter 87. NAND gates 83 and 85, for example two input terminal NAND gates, receive corresponding reference coordinate address and required coordinate address digits. The output terminals of NAND gates 83 and 85 are connected to the input terminal of inverter 87. The signals generated by multiplexers 77, 79 and 81 are applied to 5 bit comparators 89, 91 and 93, respectively, comparator 60 being comprised of comparators 89, 91 and 93.

When return switch 62 on operator control assembly 46 is energized, present coordinate data signals generated by present coordinate counters 48 and the last good devices coordinate data signal generated by buffer 50 are applied to comparator 60 which generates data signals representing the difference between the present coordinate position of wafer 12 and the coordinate position of the last good device.

The data signals generated by comparator 60 are applied to a last good device direction display 64 having direction indicators 66, 68, 70 and 72. When return switch 62 is energized, one or two direction indicators are illuminated indicating the direction or directions towards the last good device coordinates. The operator manually indexes XY table 20 until the illuminated direction indicators are extinguished. When all direction indicators 66, 68, 70 and 72 are extinguished, the present coordinate data signals and the last good device coordinate data signals being like, the tip of probe 34 is in registration with the last good device. Now that XY table 20 has been returned to the last good device coordinate position, automatic indexing of wafer 12 continues until all semiconductor devices have been tested, and the classification data signals and the address location data signals have been recorded on magnetic tape 51. For reclassifying tested dies, magnetic tape 51 is read in tape deck assembly 52 and coded data signals representing classification and address location are generated and applied to buffer 50. Sort information generated by buffer 50 is applied to test head 36 via a programmer 71 which operates to reclassify the test data applied to tester 38. Thereafter, wafer 12 and the magnetic tape are removed from probing system 10.

Wafer 12 is now mounted on an adhesive web 70 (FIG. 5) scored and the individual semiconductor devices are separated while maintaining their original orientation. The semiconductor devices are now ready to be sorted by means of a transfer system 72 shown in FIG. 3.

Referring now to FIG. 3, it will be seen that transfer system 72 comprises a tape reader 74, processing electronics 76 and a die transfer mechanism 78. Magnetic tape 51 is positioned in a tape reader 74 and wafer 12 is mounted on an XY table 80. Tape reader 74 scans the magnetic tape at high speed, searching for data signals defining the classification of the semiconductor devices to be removed as programmed by a sort selector assembly 82.

Figure 5:
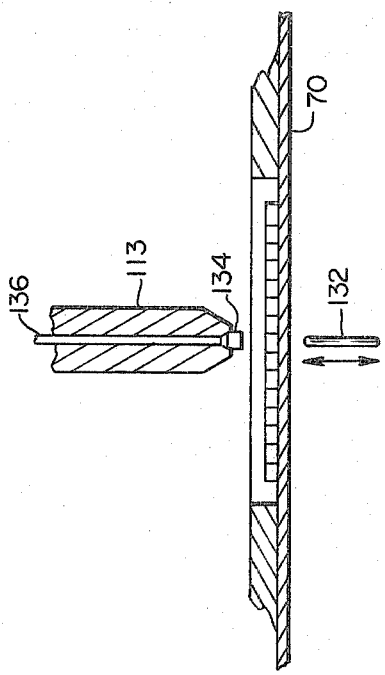
FIG. 5 is a cross-sectional view of the vacuum collet and needle mechanism of FIG. 3.
Figure 4:
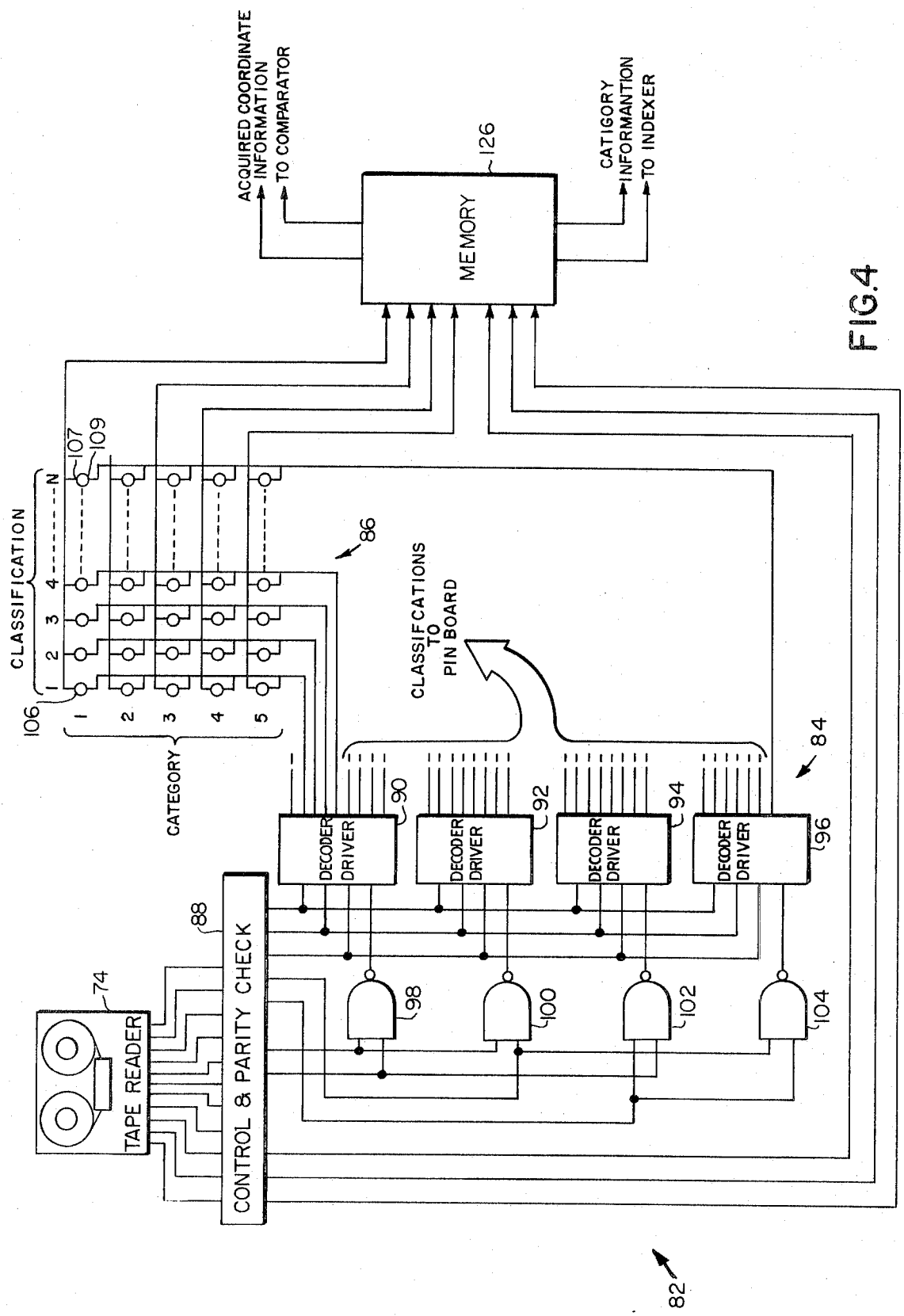
FIG. 4 is a detailed block and schematic diagram of the decoder of FIG. 3.

As best shown in FIG. 4, sort selector assembly 82 comprises a decoder assembly 84 and a pin board assembly 86. Decoder assembly 84 includes decoder/drivers 90, 92, 94 and 96 and NAND gates 98, 100, 102 and 104. Data signals read from tape reader 74 are applied to control and parity checker 88 for processing in decoder/drivers 90, 92, 94 and 96 via NAND gates 98, 100, 102 and 104, respectively. Classification data signals generated by decoder/drivers 90, 92, 94 and 96, in response to the coded classification data signals recorded on the magnetic tape, are applied to pin board assembly 86. By way of example, decoder/drivers 90, 92, 94 and 96 generate thirty different classification data signals in binary form. That is, classification data signals defining classification number one is denoted by the binary notation 00001, classification data signals defining classification number two is denoted by the notation 00010, and so forth. In the illustrated embodiment, by way of example, decoder/driver 90 generated binary coded signals defining classifications one through eight, decoder/driver 92 generates binary coded signals defining classifications nine through 17, decoder/driver 94 generates binary coded signals defining classifications 18 through 24 and decoder/driver 96 generates binary coded signals defining classifications 25 through 30. The binary coded classification data signals are applied to pin board assembly 86 which is comprised of a plurality of pin switches 106 arranged in rows and columns, the rows denoted CLASSIFICATION and the columns denoted CATEGORY. In the illustrated embodiment, by way of example, there are five rows and 30 columns. Each pin switch 106 includes electrically separated contacts 107, 109. Contacts 109 in each column are interconnected to one another and are connected to corresponding output terminals of decoder/drivers 90, 92, 94 and 96. Contacts 107 in each row are interconnected to one another and are connected to a memory 126. Pin board assembly 86 is programmed by inserting conducting pins into selected pin switches 106, each inserted conducting pin providing an electrical contact between contacts 107, 109. For example, if classifications one, three and four are to be in category 1, then conducting pins are inserted into pin switches 106 in column 1, rows 1, 3 and 4. After pin board assembly 86 has been programmed, transfer system 72 is ready to sort selected semiconductor devices having the classification programmed in pin board assembly 86. The first word on the magentic tape contains the address of reference mark 40. In order to synchronize overall system operation, the reference address is set into a reference switch assembly 108, for example digi-switches, and XY table 80 is indexed to the coordinates of reference mark 40. As best shown in FIG. 3, reference mark 40 is positioned in registration with one of a plurality of pickoff heads 115 radially mounted to a transfer turret 111, each pickoff head having collet 113 (FIG. 5). A reference switch 114 on a control panel 116 is energized and the reference address is entered into a present coordinate counter 118. The serial number assigned to wafer 12 and recorded on the magnetic tape is presented on a display 120 via a serial number buffer 122. A switch 124 on control panel 116 is energized, the addresses and classification data signals on the magnetic tape are read one after another. When one of the classifications read by tape reader 74 falls in one of the categories selected by the programming of pin board assembly 86, the XY coordinates and category information data signals are applied to memory 126, for example random access memory. In the illustrated embodiment, random access memory is a silo memory and stores XY coordinates and category information for 16 semiconductor devices, the first XY coordinate and category data signals entered into random access memory 126 being the first to be addressed out. The XY coordinate data signals addressed out of random access memory 126 and the present coordinate data signals generated by coordinate counter 118 are compared in a comparator 128. Position data signals generated by comparator 128 are applied to a control 130 for indexing XY table 80 to the XY coordinate position defined by the XY coordinate data signals addressed out of random access memory 126. Coordinate counter 118 is updated by left/right X signals and up/down Y signals generated by XY table 80 as it is indexed. When the coordinate data signals generated by coordinate counter 118 and the required coordinate data signals addressed out of random access memory 126 are like, XY table 20 is stopped.

As best shown in FIG. 5, the mechanism for removing the selected die from pressure sensitive web 70 is comprised of a reciprocating needle 132 located below web 70 in registration with collet 113 which reciprocates into and out of position above wafer 12 as turret 111 indexes in a manner hereinafter described. Needle 132 may be reciprocated by any one or a variety of techniques such as a rotary cam, a pneumatic or hydraulic cylinder or by means of a solenoid. Needle 132 is formed with a slightly rounded tip which, upon reciprocation, comes up under each die forcing it upwards away from web 70 and into a conical annular recess 134, formed in the lower end of each collet 113, recess 134 being slightly larger than the die. Each collet 113 is formed with a central passage 136 connected to a vacuum source, whereby when an individual die is transferred from web 70 to collet 113 it will be held there unitl subsequently deposited at one of a plurality of deposit stations 138.

After the first selected die is transferred from web 70 to collet 113, turret 111 is indexed to the next position. A sensor 140, for example a photo detector, views the first selected die to determine whether its size is within specified limits. In the meantime, XY table is moved until the second selected die is in registration with another collet 113. The process continues until all dies in the selected category have been transferred from web 70. As turret 111 indexed, a command signal from a turret control 142, which receives category data signals generated by random access memory 126 and accept or reject data signals generated by photo detector 140, operates to release the die held by collet 113 at the selected delivery station 138.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A method of sorting semiconductor devices from a wafer of said devices, said method comprising the steps of:
    a. marking said wafer with reference indicia describing a preselected arbitrary reference coordinate position;
    b. mounting said wafer on probe and test means having test probe means and means for recording coded signals on a recording stratum;
    c. registering said test probe means and said reference indicia;
    d. generating a coded signal defining said preselected reference coordinate position as an arbitrary reference coordinate position for said reference indicia;
    e. recording said arbitrary reference coordinate position coded signal on said recording stratum;
    f. probing and testing said wafer by registering said test probe means and selected ones of said devices;
    g. generating coded data signals defining the absolute coordinate position of said selected ones of said devices relative to said arbitrary reference coordinate position for said reference indicia and the characteristics of said devices at said absolute coordinate position;
    h. recording said coded data signals for said selected ones of said devices on said recording stratum;
    i. transferring said wafer and recording stratum to transfer means having device removing means and means for reading said recording stratum;
    j. registering said device removing means and said reference indicia;
    k. synchronizing the position of said device removing means and said reference indicia relative to the position of said test probe means and said reference indicia as defined by said arbitrary reference coordinate position;
    l. reading said recorded coded data signals and selectively registering said device removing means and selected ones of said devices having preselected characteristics at selected absolute coordinate positions as defined by said recorded data signals; and
    m. removing selected ones of said devices from said wafer according to said recorded coded data signals.

2. The method of sorting semiconductor devices from a wafer of said devices as claimed in claim 1 including the steps of recording serial number coded signals on said magnetic recording stratum, said serial number coded signals uniquely identifying said wafer.

3. The method of sorting semiconductor devices from a wafer as claimed in claim 1 including the step of storing in an intermediate temporary storage said coded data signals representing the characteristics and coordinate position of the last good device probed.

4. The method of sorting semiconductor devices from a wafer of said devices as claimed in claim 1 including the steps of:
    a. mounting said wafer on an adhesive web after recording said coded data signals; and
    b. separating said devices on said web from one another while maintaining their original orientation prior to removing said devices from said wafer.

5. The method of sorting semiconductor devices from a monolithic wafer as claimed in claim 4 wherein said removing step includes the steps of:
    a. reciprocating needle means in position below said web and in registration with a selected device against said web and forcing said selected devices upwards;
    b. reciprocating a collet in position above said wafer and in registration with said selected device towards said selected device; and
    c. removing said selected device from said web by said collet.

6. The method of sorting semiconductor devices from a wafer as claimed in claim 5 including the steps of depositing said removed device at a station selected according to said coded data signals representing the characteristics of said device.

7. A system for classifying semiconductor devices in a wafer of said devices, said system comprising:
    a. means for marking said wafer with reference indicia describing a preselected arbitrary reference coordinate position;

b. prober means including indexing means on which said wafer is mounted, probe means for probing selected ones of said devices, and tester means for generating test data signals representing the characteristics of said semiconductor devices;

c. reference means for generating reference data signals defining registration of said arbitrary reference coordinate position on said wafer and said probe means;

d. processor means connected to said prober means and said reference means for generating coded coordinate data signals defining the absolute coordinate positions of said semiconductor devices with respect to said arbitrary reference coordinate position; and e. recorder means operatively connected to said processor means, said recorder means including a magnetic recording stratum, said recorder means recording on said magnetic recording stratum said test data signals and said absolute coordinate position data signals for said semiconductor devices.

8. The system for classifying semiconductor devices as claimed in claim 7 wherein said processor means includes buffer means operatively connected to said prober means and recorder means, said buffer means storing test data signals representing the last semiconductor device tested having acceptable characteristics and said coordinate data signals defining the absolute coordinate position of said last tested semiconductor device having acceptable characteristics.

9. The system for classifying semiconductor devices as claimed in claim 7 wherein said processor means includes present coordinate counter means and comparator means, said present coordinate counter means operatively connected to said prober means, said comparator means operatively connected to said present coordinate counter means and said buffer means, said present coordinate counter means generating data signals defining the present coordinate position of said indexing means, said comparator means generating data signals defining the difference between the present coordinate position of said indexing means and the coordinate position of the last tested semiconductor device having acceptable characteristics.

10. A system for removing semiconductor devices from a monolithic wafer of said devices according to coded instructions prerecorded on a magnetic recording stratum, said coded instructions defining the characteristics of selected ones of said semiconductor device and the absolute coordinate position of each said selected semiconductor device relative to a reference indicia at a preselected coordinate position on said wafer, said system comprising;

a. reader means for generating coded data signals representing the coded instructions on said magnetic recording stratum, said coded data signals including classifying data signals defining the characteristics of said semiconductor devices and absolute coordinate position data signals defining the location of said semiconductor devices relative to the coordinate position of said reference indicia;

b. sort means including indexer means on which said wafer is mounted and transfer means for removing selected semiconductor devices from said wafer; and c. processor means operatively connected to said reader means and sort means for generating command signals responsive to said coded data signals for controlling said sort means.

11. The system for removing semiconductor devices from a wafer as claimed in claim 10 wherein said processor means includes programmable category means operatively connected to said reader means for generating category data signals representing selected device characteristics, said transfer means removing selected semiconductor devices having the characteristics defined by said category data signals.

12. The system for removing semiconductor devices from a wafer as claimed in claim 10 wherein said wafer is mounted on an adhesive web and wherein said transfer means includes:

a. reciprocating needle means mounted in position below said web in registration with a selected device to be removed;

b. reciprocating collet means mounted in position above said wafer in registration with said selected device; and c. drive means operatively connected to said needle means and said collet means, said drive means reciprocating said needle upwards into contact with said web for forcing a selected device upwards, said drive means reciprocating said collet downwards toward said selected device, said collet means operating to remove said selected device from said wafer.

13. A system for sorting semiconductor devices in a wafer of said devices, said system comprising:

a. means for marking said wafer with reference indicia describing a preselected arbitrary reference coordinate position;

b. prober means including indexing means on which said wafer is mounted, probe means for probing selected ones of said devices, and tester means for generating test data signals representing the characteristics of said semiconductor devices;

c. reference means for generating reference data signals defining registration of said arbitrary reference coordinate position on said wafer and said probe means;

d. processor means connected to said prober means and said referenc means for generating coordinate data signals defining the absolute coordinate positions of said semiconductor devices with respect to said arbitrary reference coordinate position; and e. recorder means operatively connected to said processor means, said recorder means including a magnetic recording stratum, said recorder means recording on said magnetic recording stratum said test data signals and said absolute coordinate position data signals for said semiconductor devices;

f. reader means for generating coded data signals representing said data signals recorded on said magnetic recording stratum; said coded data signals generated by said reader means including classifying data signals defining the characteristics of said semiconductor devices and absolute coordinate position signals defining the location of said semiconductor devices relative to the coordinate position of said reference indicia:

g. sort means including position means on which said wafer is mounted and transfer means for removing selected semiconductor devices from said wafer; and h. category means operatively connected to said reader means and sort means for generating command signals responsive to said coded data signals generated by said reader means for controlling said sort means.

14. The system for sorting semicoductor devices as claimed in claim 13 wherein said processor means includes memory means operatively connected to said prober means and recorder means, said memory means storing test data signals representing the last semiconductor device tested having acceptable characteristics and said coordinate data signals defining the absolute coordinate position of said last tested semiconductor device haveing acceptable characteristics.

15. The system for sorting semiconductor devices as claimed in claim 14 wherein said processor means includes present coordinate counter means and comparator means, said present coordinate counter means operatively connected to said prober means, said comparator means operatively connected to said present coordinate counter means and said memory means, said present coordinate counter means generating data signals defining the present coordinate position of said indexing means, said comparator means generating data sigals defining the difference between the present coordinate position of said indexing means and the coordinate position of the last tested semiconductor device having acceptable characteristics.

16. The system for sorting semiconductor devices as claimed in claim 15 wherein said category means includes programmable pin board means operatively connected to said reader means for generating category data signals representing selected device characteristics, said transfer means removing selected semiconductor devices having the characteristics defined by said category data signals.

17. A method of sorting semiconductor devices from a wafer of devices using a probing device and a die transfer device, the probing device including test probe means and the die transfer device including vacuum collet means, said method comprising the steps of:

a. placing a recording stratum in the probing device;

b. marking the wafer with reference indicia denoting a preselected reference coordinate position;

c. mounting the wafer on the probing device;

d. registering the test probe means and said reference indicia;

e. generating a coded signal defining an arbitrary reference coordinate position for said reference indicia;

f. recording said coded signal defining said arbitrary reference coordinate position on said recording stratum;

g. selectively registering the test probe means and selected ones of the devices;

h. generating coded data signals defining an absolute coordinate position on each one of the devices relative to said arbitrary reference coordinate position and a characteristic of each one of the devices at said absolute coordinate position;

i. transferring the wafer and recording stratum from the probing device to the die transfer device;

j. registering the vacuum collet means and said reference indicia;

k. synchronizing the position of the collet means and said reference indicia relative to the position of the test probe means and said reference indicia as defined by said arbitrary reference coordinate position;

l. reading said recorded coded data signals and selectively registering the vacuum collet means and selected ones of the devices having preselected characteristics at selected absolute coordinate positions as defined by said recorded coded data signals; and m. removing selected ones of the devices having preselected characteristics at selected absolute coordinate positions by means of the vacuum collet means.

* * * * *